US011271846B2

(12) United States Patent
Krishan

(10) Patent No.: US 11,271,846 B2
(45) Date of Patent: Mar. 8, 2022

(54) METHODS, SYSTEMS, AND COMPUTER READABLE MEDIA FOR LOCALITY-BASED SELECTION AND ROUTING OF TRAFFIC TO PRODUCER NETWORK FUNCTIONS (NFS)

(71) Applicant: Oracle International Corporation, Redwood Shores, CA (US)

(72) Inventor: Rajiv Krishan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/356,446

(22) Filed: Mar. 18, 2019

(65) Prior Publication Data

US 2020/0127916 A1 Apr. 23, 2020

(30) Foreign Application Priority Data

Oct. 22, 2018 (IN) .............................. 201841039876

(51) Int. Cl.
*H04L 12/733* (2013.01)
*H04L 12/751* (2013.01)
(Continued)

(52) U.S. Cl.
CPC ............ *H04L 45/126* (2013.01); *H04L 45/02* (2013.01)

(58) Field of Classification Search
CPC .............................. H04L 45/126; H04L 45/02
See application file for complete search history.

(56) References Cited

U.S. PATENT DOCUMENTS

| 5,381,413 A | 1/1995 | Tobagi et al. |
| 6,748,435 B1 | 6/2004 | Wang et al. |

(Continued)

FOREIGN PATENT DOCUMENTS

| CN | 105635345 B | 2/2019 |
| CN | 109788078 A | 5/2019 |

(Continued)

OTHER PUBLICATIONS

Applicant-Initiated Interview Summary for U.S. Appl. No. 16/176,920, (dated Apr. 1, 2020).

(Continued)

*Primary Examiner* — John A Follansbee
*Assistant Examiner* — Raqiul A Choudhury
(74) *Attorney, Agent, or Firm* — Jenkins, Wilson, Taylor & Hunt, P.A.

(57) ABSTRACT

A method for locality-based selection and routing of network traffic to producer network functions (NFs) includes registering, by producer NFs, locality information with a network function registration function (NRF). The method further includes configuring, for each of a plurality of consumer NFs, locality preference rules. The method further includes detecting, by one of the consumer NFs, a need for a service provided by a plurality of different producer NFs, at least some of which are located in data centers with different localities. The method further includes selecting, by or on behalf of the one consumer NF and using the locality information registered for the producer NFs and the locality preference rules, a producer NF for providing the service to the one consumer NF.

20 Claims, 8 Drawing Sheets

(51) Int. Cl.
*H04L 45/12* (2022.01)
*H04L 45/02* (2022.01)

(56) References Cited

U.S. PATENT DOCUMENTS

| | | | |
|---|---|---|---|
| 7,782,776 B2 | 8/2010 | Shankar et al. | |
| 8,023,482 B2 | 9/2011 | Gong et al. | |
| 8,300,637 B1 | 10/2012 | Bennett, III et al. | |
| 8,645,565 B2 | 2/2014 | Sparks et al. | |
| 8,811,228 B2 | 8/2014 | Lopez et al. | |
| 8,879,431 B2 | 11/2014 | Ridel et al. | |
| 8,954,080 B2 | 2/2015 | Janakiraman et al. | |
| 9,246,762 B1* | 1/2016 | Watkins | H04J 3/0641 |
| 9,667,590 B2 | 5/2017 | Yan et al. | |
| 10,097,504 B2 | 10/2018 | Backholm | |
| 10,285,155 B1 | 5/2019 | Dodd-Noble et al. | |
| 10,299,128 B1 | 5/2019 | Suthar et al. | |
| 10,361,843 B1 | 7/2019 | Suthar et al. | |
| 10,595,256 B1 | 3/2020 | Marupaduga et al. | |
| 10,609,154 B2 | 3/2020 | Talebi Fard et al. | |
| 10,609,530 B1 | 3/2020 | Patil et al. | |
| 10,616,934 B2 | 4/2020 | Talebi Fard et al. | |
| 10,637,753 B1 | 4/2020 | Taft et al. | |
| 10,652,098 B2 | 5/2020 | Kim | |
| 10,772,062 B1 | 9/2020 | Albasheir et al. | |
| 10,778,527 B2 | 9/2020 | Assali et al. | |
| 10,791,044 B1 | 9/2020 | Krishan et al. | |
| 10,819,636 B1 | 10/2020 | Goel | |
| 10,880,370 B2 | 12/2020 | Seenappa et al. | |
| 2003/0174649 A1 | 9/2003 | Shankar et al. | |
| 2003/0223414 A1 | 12/2003 | Wong | |
| 2004/0003069 A1 | 1/2004 | Wong | |
| 2004/0141473 A1 | 7/2004 | Buot | |
| 2004/0208183 A1 | 10/2004 | Balachandran et al. | |
| 2005/0193096 A1* | 9/2005 | Yu | H04L 69/329 709/219 |
| 2006/0010224 A1 | 1/2006 | Sekar et al. | |
| 2007/0242738 A1 | 10/2007 | Park et al. | |
| 2009/0055835 A1 | 2/2009 | Zhu | |
| 2009/0141625 A1 | 6/2009 | Ghai et al. | |
| 2009/0222584 A1 | 9/2009 | Josefsberg et al. | |
| 2011/0078674 A1 | 3/2011 | Ershov | |
| 2011/0202604 A1 | 8/2011 | Craig et al. | |
| 2013/0029708 A1 | 1/2013 | Fox et al. | |
| 2013/0039176 A1 | 2/2013 | Kanode et al. | |
| 2013/0198269 A1 | 8/2013 | Fleischman et al. | |
| 2013/0272123 A1 | 10/2013 | Lee et al. | |
| 2014/0040975 A1 | 2/2014 | Raleigh et al. | |
| 2014/0379901 A1 | 12/2014 | Tseitlin et al. | |
| 2015/0016266 A1 | 1/2015 | Dumitrescu et al. | |
| 2015/0071074 A1 | 3/2015 | Zaidi et al. | |
| 2015/0263987 A1 | 9/2015 | Klein et al. | |
| 2016/0142324 A1 | 5/2016 | Vihtari et al. | |
| 2016/0156513 A1* | 6/2016 | Zhang | H04L 67/10 709/220 |
| 2016/0164788 A1 | 6/2016 | Goel et al. | |
| 2016/0234119 A1 | 8/2016 | Zaidi et al. | |
| 2016/0315743 A1 | 10/2016 | Nagaraj et al. | |
| 2016/0352588 A1 | 12/2016 | Subbarayan et al. | |
| 2016/0380906 A1* | 12/2016 | Hodique | G06Q 30/0206 709/226 |
| 2017/0221015 A1* | 8/2017 | June | G06Q 10/06315 |
| 2018/0039494 A1 | 2/2018 | Lander et al. | |
| 2018/0083882 A1 | 3/2018 | Krishan et al. | |
| 2018/0159780 A1 | 6/2018 | Essigmann et al. | |
| 2018/0183724 A1 | 6/2018 | Callard et al. | |
| 2018/0213391 A1 | 7/2018 | Inoue | |
| 2018/0262625 A1 | 9/2018 | McCarley et al. | |
| 2018/0285794 A1* | 10/2018 | Gray-Donald | G06F 9/5038 |
| 2018/0324247 A1* | 11/2018 | Hood | H04L 12/46 |
| 2018/0324646 A1 | 11/2018 | Lee et al. | |
| 2018/0343567 A1 | 11/2018 | Ashrafi | |
| 2019/0007366 A1* | 1/2019 | Voegele | H04L 47/125 |
| 2019/0045351 A1 | 2/2019 | Zee et al. | |
| 2019/0075552 A1 | 3/2019 | Yu et al. | |
| 2019/0116486 A1 | 4/2019 | Kim et al. | |
| 2019/0116521 A1 | 4/2019 | Qiao et al. | |
| 2019/0140895 A1* | 5/2019 | Ennis, Jr. | G06F 9/541 |
| 2019/0158364 A1 | 5/2019 | Zhang et al. | |
| 2019/0173740 A1 | 6/2019 | Zhang et al. | |
| 2019/0174561 A1 | 6/2019 | Sivavakeesar | |
| 2019/0182875 A1 | 6/2019 | Talebi Fard et al. | |
| 2019/0191348 A1 | 6/2019 | Futaki et al. | |
| 2019/0191467 A1 | 6/2019 | Dao et al. | |
| 2019/0222633 A1* | 7/2019 | Howes | H04L 67/1002 |
| 2019/0223093 A1 | 7/2019 | Watfa et al. | |
| 2019/0230556 A1 | 7/2019 | Lee | |
| 2019/0261244 A1 | 8/2019 | Jung et al. | |
| 2019/0268270 A1 | 8/2019 | Fattah | |
| 2019/0306251 A1 | 10/2019 | Talebi Fard et al. | |
| 2019/0306907 A1 | 10/2019 | Andreoli-Fang et al. | |
| 2019/0313236 A1 | 10/2019 | Lee et al. | |
| 2019/0313437 A1 | 10/2019 | Jung et al. | |
| 2019/0313469 A1 | 10/2019 | Karampatsis et al. | |
| 2019/0335002 A1 | 10/2019 | Bogineni et al. | |
| 2019/0335534 A1 | 10/2019 | Atarius et al. | |
| 2019/0342229 A1* | 11/2019 | Khinvasara | H04L 45/46 |
| 2019/0342921 A1 | 11/2019 | Loehr et al. | |
| 2019/0349901 A1 | 11/2019 | Basu Mallick et al. | |
| 2019/0357092 A1 | 11/2019 | Jung et al. | |
| 2019/0380031 A1 | 12/2019 | Suthar et al. | |
| 2019/0394284 A1* | 12/2019 | Baghel | H04L 67/42 |
| 2019/0394624 A1 | 12/2019 | Karampatsis et al. | |
| 2019/0394833 A1 | 12/2019 | Talebi Fard et al. | |
| 2020/0007632 A1 | 1/2020 | Landais et al. | |
| 2020/0008069 A1 | 1/2020 | Zhu et al. | |
| 2020/0028920 A1 | 1/2020 | Livanos et al. | |
| 2020/0045753 A1 | 2/2020 | Dao et al. | |
| 2020/0045767 A1 | 2/2020 | Velev et al. | |
| 2020/0053670 A1 | 2/2020 | Jung et al. | |
| 2020/0053724 A1 | 2/2020 | Molavianjazi et al. | |
| 2020/0053828 A1 | 2/2020 | Bharatia et al. | |
| 2020/0059420 A1* | 2/2020 | Abraham | G06F 9/5072 |
| 2020/0059856 A1 | 2/2020 | Cui et al. | |
| 2020/0084663 A1 | 3/2020 | Park et al. | |
| 2020/0092423 A1 | 3/2020 | Qiao et al. | |
| 2020/0092424 A1 | 3/2020 | Qiao et al. | |
| 2020/0136911 A1 | 4/2020 | Assali et al. | |
| 2020/0137174 A1 | 4/2020 | Stammers et al. | |
| 2020/0177629 A1 | 6/2020 | Hooda et al. | |
| 2020/0313996 A1 | 10/2020 | Krishan et al. | |
| 2020/0404608 A1 | 12/2020 | Albasheir et al. | |
| 2020/0412597 A1 | 12/2020 | Goel et al. | |
| 2021/0000723 A1 | 1/2021 | Strand et al. | |
| 2021/0007023 A1 | 1/2021 | Umapathy et al. | |
| 2021/0044481 A1 | 2/2021 | Xu et al. | |
| 2021/0067480 A1 | 3/2021 | Goel | |
| 2021/0067485 A1 | 3/2021 | Goel | |
| 2021/0105214 A1 | 4/2021 | Goel | |
| 2021/0204200 A1 | 7/2021 | Krishan et al. | |

FOREIGN PATENT DOCUMENTS

| | | |
|---|---|---|
| EP | 2 575 303 A1 | 4/2013 |
| WO | WO 2017/143915 A1 | 8/2017 |
| WO | WO 2018/174021 A1 | 9/2018 |
| WO | WO 2018/174516 A1 | 9/2018 |
| WO | WO 2019/034609 A1 | 2/2019 |
| WO | WO 2019/062596 A1 | 4/2019 |
| WO | WO 2019/076273 A1 | 4/2019 |
| WO | WO 2019/144321 A1 | 8/2019 |
| WO | WO 2019/220172 A1 | 11/2019 |
| WO | WO 2020/091934 A1 | 5/2020 |
| WO | WO 2020/263486 A1 | 12/2020 |
| WO | WO 2021/040827 A1 | 3/2021 |
| WO | WO 2021/055998 A1 | 3/2021 |
| WO | WO 2021/138074 A1 | 7/2021 |

OTHER PUBLICATIONS

Non-Final Office Action for U.S. Appl. No. 16/176,920 (dated Mar. 6, 2020).

(56) References Cited

OTHER PUBLICATIONS

Notification of Transmittal of the International Search Report and the Written Opinion of the International Searching Authority, or the Declaration for International Application Serial No. PCT/US2019/053912 (dated Dec. 18, 2019).
Commonly-Assigned, co-pending U.S. Appl. No. 16/697,021 for "Methods, Systems, and Computer Readable Media for Diameter-Peer-Wide Egress Rate Limiting at Diameter Relay Agent (DRA)," (Unpublished, filed Nov. 27, 2019).
"3rd Generation Partnership Project; Technical Specification Group Services and System Aspects; Architecture enhancements to facilitate communications with packet data networks and applications (Release 16)," 3GPP TS 23.682, V16.4.0, pp. 1-30 (Sep. 2019).
"Diameter and Diameter Applications," Alcatel-Lucent, http://infodoc.alcatel-lucent.eom/html/0_add-h-f/93-0098-HTML/7750_SR_OS_Triple_Play_Guide/GX-PolicyMgmt.html, pp. 1-40 (Aug. 22, 2019).
"3rd Generation Partnership Project; Technical Specification Group Radio Access Network; NG-RAN; NG Application Protocol (NGAP) (Release 15)," 3GPP TS 38.413, V15.4.0, pp. 1-328 (Jul. 2019).
Commonly-Assigned, co-pending U.S. Appl. No. 16/453,955 for "Methods, Systems, and Computer Readable Media for Producer Network Function (NF) Service Instance Wide Egress Rate Limiting at Service Communication Proxy (SCP)," (Unpublished, filed Jun. 26, 2019).
"3rd Generation Partnership Project; Technical Specification Group Core Network and Terminals; 5G System; Network Function Repository Services; Stage 3 (Release 16)," 3GPP TS 29.510, V16.0.0, pp. 1-135 (Jun. 2019).
"3rd Generation Partnership Project; Technical Specification Group Core Network and Terminals; 5G System; Restoration Procedures (Release 16)," 3GPP TS 23.527, V16.0.0, pp. 1-19 (Jun. 2019).
"3rd Generation Partnership Project; Technical Specification Group Core Network and Terminals; Numbering, addressing and identification (Release 15)," 3GPP TS 23.003, V15.7.0, pp. 1-131 (Jun. 2019).
"Class of Service Feature Guide (Routers and EX9200 Switches)," Junos® OS, Juniper Networks, pp. 1-1530 (Apr. 10, 2019).
"3rd Generation Partnership Project; Technical Specification Group Services and System Aspects; System Architecture and 5G; Stage 2 (Release 16)," 3GPP TS 23.501, V16.0.0, pp. 1-318 (Mar. 2019).
Commonly-Assigned, co-pending U.S. Appl. No. 16/369,691 for "Methods, System, and Computer Readable Media for Handling Multiple Versions of Same Service Provided by Producer Network Functions (NFs)," (Unpublished, filed Mar. 29, 2019).
Penttinen, "5G Explained: Security and Deployment of Advanced Mobile Communications," Chapter 6, Section 6.3.8 NRF, 2 pages (Feb. 2019).
"Oracle Communications Diameter Signaling Router," Release Notice, Release 8.3, E93179 Revision 02, Oracle, pp. 1-98 (Dec. 2018).
"3rd Generation Partnership Project; Technical Specification Group Network and Terminals; 5G Systems; Principles and Guidelines for Services Definition; Stage 3 (Release 15)," 3GPP TS 29.501, V15.2.0, pp. 1-66 (Dec. 2018).
Commonly-Assigned, co-pending U.S. Appl. No. 16/176,920 for "Methods, Systems, and Computer Readable Media for Providing a Service Proxy Function in a Telecommunications Network Core Using a Service-Based Architecture," (Unpublished, filed Oct. 31, 2018).
"Addressing 5G Network Function Requirements," Intel® FPGAs and Intel PAC 5G QoS and IPSec Benchmarking, White Paper, pp. 1-8 (Oct. 2018).
"CPS vDRA Configuration Guide," Release 18.3.0 (Restricted Release)(1), Cisco, pp. 1-130 (Sep. 14, 2018).
"How to Do Rate Limiting of Diameter Messages Using NetScaler," Citrix Systems Inc., pp. 1-3 (Sep. 4, 2018).
"5G; 5G System; Technical Realization of Service Based Architecture; Stage 3 (3GPP TS 29.500 version 15.0.0 Release 15)," ETSI TS 129 500, V15.0.0, pp. 1-29 (Jul. 2018).
"3rd Generation Partnership Project; Technical Specification Group Services and System Aspects; Study on Enhancements to the Service-Based Architecture (Release 16)," 3GPP TR 23.742, V0.3.0, pp. 1-64 (Jul. 2018).
"3rd Generation Partnership Project; Technical Specification Group Services and System Aspects; Study on Enhancements to the Service-Based Architecture (Release 16)," 3GPP TR 23.742, V0.2.0, pp. 1-39 (Jun. 2018).
"5G; Procedures for the 5G System (3GPP TS 23.502 version 15.2.0 Release 15)," ETSI TS 123502 V15.2.0, pp. 1-46 (Jun. 2018).
"Cisco Ultra 5G Packet Core Solution," Cisco, White paper, https://www.cisco.com/c/dam/en/us/products/collateral/routers/network-convergence-system-500-series-routers/white-paper-c11-740360.pdf, pp. 1-11 (2018).
Scholl et al., "An API First Approach to Microservices Development," Oracle, https://blogs.oracle.com/developers/an-api-first-approach-to-microservices-development, pp. 1-12 (Nov. 2017).
Brown et al., "Service-Based Architecture for 5G Core Networks," Huawei, Heavy Reading, https://www.3g4g.co.uk/5G/5Gtech_6004_2017_11_Service-Based-Architecture-for-5G-Core-Networks_HR_Huawei.pdf, pp. 1-12 (Nov. 2017).
"3rd Generation Partnership Project; Technical Specification Group Services and System Aspects; System Architecture for the 5G System; Stage 2 (Release 15)," 3GPP TS 23.501, V1.5.0, pp. 1-170 (Nov. 2017).
"Pseudo-CR on Service Discovery and Registration using NRF service," Ericsson, 3GPP TSG CT4 Meeting #79, 3GPP TR 29.891—v0.3.0, pp. 1-4 (Aug. 21-25, 2017).
Carlton et al., "HTTP and DNS in a 5G World," https://www.computerworld.com/article/3204594/http-and-dns-in-a-5g-world.html, pp. 1-5 (Jun. 30, 2017).
Benacer et al., "A High-Speed Traffic Manager Architecture for Flow-Based Networking," pp. 1-4 (2017).
"Dynamically Reconfigurable Optical-Wireless Backhaul/Fronthaul with Cognitive Control Plane for Small Cells and Cloud-RANs: D3.1 Analysis of state of the art on scalable control plane design and techniques for user mobility awareness. Definition of 5G-XHaul control plane requirements," European Commission, 5G-XHaul, pp. 1-107 (Jun. 31, 2016).
"Multi-Layer Security Protection for Signaling Networks," Oracle Communications, Oracle white paper, pp. 1-9 (Jan. 2016).
Kantola et al., "Policy-based communications for 5G mobile with customer edge switching," Security and Communication Networks, vol. 9, pp. 3070-3082 (2016).
Preston-Werner, "Semantic Versioning 2.0.0", Oracle, pp. 1-5 (Jun. 2013).
Fajardo et al., "Diameter Based Protocol," Internet Engineering Task Force (IETF) Request for Comments: 6733, pp. 1-152 (Oct. 2012).
Gulbrandsen et al., "A DNS RR for specifying the location of services (DNS SRV)," RFC 2782, pp. 1-12 (Feb. 2000).
"3rd Generation Partnership Project; Technical Specification Group Core Network and Terminals, 5G Systems; Network Function Repository Services; Stage 3 (Release 15)", 3GPP TS 29.510, V15.2.0, pp. 1-113 (Dec. 2018).
"3rd Generation Partnership Project; Technical Specification Group Services and System Aspects; Study on Enhancements to the Service-Based Architecture (Release 16)", 3GPP TR 23.742, V16.0.0, pp. 1-131 (Dec. 2018).
Fielding et al. "Hypertext Transfer Protocol (HTTP/1.1): Semantics and Content", Internet Engineering Taskforce (IETF) Request for Comments: 7231, IETF RFC 7231, pp. 1-102 (Jun. 2014).
Notice of Allowance and Fee(s) Due for U.S. Appl. No. 16/369,691 (dated May 12, 2020).
Notice of Allowance and Fee(s) Due for U.S. Appl. No. 16/176,920 (dated Apr. 16, 2020).
"3rd Generation Partnership Project; Technical Specification Group Core Network and Terminals; 5G Systems; Network Function Repository Services; Stage 3 (Release 16)," 3GPP TS 29.510 V.16.1.1, pp. 1-150 (Oct. 2019).

(56) References Cited

OTHER PUBLICATIONS

"3rd Generation Partnership Project; Technical Specification Group Core Network and Terminals; 5G System; Technical Realization of Service Based Architecture; Stage 3 (Release 16)," 3GPP TS 29.500 V16.1.0, pp. 1-43 (Sep. 2019).

"3rd Generation Partnership Project; Technical Specification Group Service and System Aspects; System Architecture for the 5G System (5GS); Stage 2 (Release 16)," 3GPP TS 23.501 V16.2.0, pp. 1-391 (Sep. 2019).

Nichols et al., "Definition of the Differentiated Services Field (DS Field) in the IPv4 and IPv6 Headers," Internet Engineering Task Force (IETF) Netwok Working Group Request for Comments (RFC) 2474, The Internet Society, pp. 1-20 (Dec. 1998).

Notice of Allowance and Fee(s) Due for U.S. Appl. No. 16/555,817 (dated Mar. 24, 2021).

International Search Report and Written Opinion for Patent Cooperation Treaty Application Serial No. PCT/US2020/061885 (dated Feb. 4, 2021).

International Search Report and Written Opinion for Patent Cooperation Treaty Application Serial No. PCT/US2020/057712 (dated Feb. 2, 2021).

Cheshire, S. et al., "Apple's DNS Long-Lived Queries protocol draft-sekar-dns-llq-06," Internet Engineering Task Force (IETF), pp. 1-26 (Aug. 23, 2019).

Final Office Action for U.S. Appl. No. 16/697,021 (dated Feb. 2, 2021).

Applicant-Initiated Interview Summary for U.S. Appl. No. 16/697,021 (Jan. 26, 2021).

"3rd Generation Partnership Project; Technical Specification Group Services and System Aspects; Procedures for the 5G System (5GS); Stage 2 (Release 16)," 3GPP TS 23.502, V16.7.0, pp. 1-603 (Dec. 2020).

"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).

"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).

"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).

Notification of Transmittal of the International Search Report and the Written Opinion of the International Searching Authority, or the Declaration for International Application Serial No. PCT/US2020/065765 (dated Apr. 15, 2021).

Ex Parte Quayle Action for U.S. Appl. No. 16/730,799 (Apr. 7, 2021).

Commonly-Assigned, co-pending U.S. Appl. No. 17/156,149 for "Methods, Systems, and Computer Readable Media for Optimized Routing of Messages Relating to Existing Network Function (NF) Subscriptions Using an Intermediate Forwarding NF Repository Function (NRF)," (Unpublished, filed Nov. 9, 2020).

"5G; System architecture for the 5G System (5GS) (3GPP TS 23.501 version 15.6.0 Release 15)," ETSI TS 123 501, V15.6.0, pp. 1-168 (Oct. 2019).

"5G; 5G System; Network function repository services; Stage 3 (3GPP TS 29.510 version 15.5.1 Release 15)," ETSI TS 129 510, V15.5.1, pp. 1-132 (Oct. 2019).

"5G; 5G System; Technical Realization of Service Based Architecture; Stage 3 (3GPP TS 29.500 version 15.5.0 Release 15)," ETSI TS 129 500, V15.5.0, pp. 1-40 (Sep. 2019).

Notice of Publication for International Application Serial No. PCT/US2020/061885 (dated Jun. 3, 2021).

Notice of Allowance and Fee(s) Due for U.S. Appl. No. 17/001,599 (dated May 17, 2021).

Advisory Action for U.S. Appl. No. 16/697,021 (dated May 7, 2021).

Applicant-Initiated Interview Summary for U.S. Appl. No. 17/001,599 (dated May 5, 2021).

Commonly-Assigned, co-pending U.S. Appl. No. 17/102,404 for "Methods, Systems, and Computer Readable Media for Policing Access Point Name-Aggregate Maximum Bit Rate (APN-AMBR) Across Packet Data Network Gateway Data Plane (P-GW DP) Worker Instances," (Unpublished, filed Sep. 23, 2020).

Notice of Allowance and Fee(s) Due for U.S. Appl. No. 16/555,817 (dated Dec. 3, 2020).

Commonly-Assigned, co-pending U.S. Continuation-in-Part U.S. Appl. No. 17/102,404 for "Methods, Systems, and Computer Readable Media for Policing Access Point Name-Aggregate Maximum Bit Rate (APN-AMBR) Across Packet Data Network Gateway Data Plane (P-GW DP) Worker Instances," (Unpublished, filed Nov. 23, 2020).

Commonly-Assigned, co-pending U.S. Appl. No. 17/082,871 for "Methods, Systems, and Computer Readable Media for Rank Processing for Network Function Selection," (Unpublished, filed Oct. 28, 2020).

Commonly-Assigned, co-pending U.S. Continuation-in-Part U.S. Appl. No. 17/074,553 for "Methods, Systems, and Computer Readable Media for Actively Discovering and Tracking Addresses Associated with 4G Service Endpoints," (Unpublished, filed Oct. 19, 2020).

"P-GW Administration Guide, StarOS Release 21.20," Cisco, pp. 1-1164 (Oct. 11, 2020).

"3rd Generation Partnership Project; Technical Specification Group Core Network and Terminals; Non-Access-Stratum (NAS) protocol for Evolved Packet System (EPS); Stage 3 (Release 17)," 3GPP TS 24.301, V17.0.0, pp. 1-585 (Sep. 2020).

3rd Generation Partnership Project; Technical Specification Group Services and System Aspects; Architecture enhancements to facilitate communications with packet data networks and applications (Release 16), 3GPP TS 23.682, V16.8.0, pp. 1-135 (Sep. 2020).

Non-Final Office Action for U.S. Appl. No. 16/697,021 (dated Sep. 29, 2020).

Commonly-Assigned, co-pending U.S. Appl. No. 17/009,725 for "Methods, Systems, and Computer Readable Media for Service Communications Proxy (SCP)-Specific Prioritized Network Function (NF) Discovery and Routing," (Unpublished, filed Sep. 1, 2020).

Notice of Allowance and Fee(s) Due and Examiner-Initiated Interview Summary for U.S. Appl. No. 16/453,955 (dated Aug. 26, 2020).

Commonly-Assigned, co-pending U.S. Appl. No. 17/001,599 for "Methods, Systems, and Computer Readable Media for Optimized Network Function (NF) Discovery and Routing Using Service Communications Proxy (SCP) and NF Repository Function (NRF)," (Unpublished, filed Aug. 24, 2020).

Notification of the Transmittal of the International Search Report and the Written Opinion of the International Searching Authority, or the Declaration for International Application No. PCT/US2020/034723 (dated Aug. 17, 2020).

Non-Final Office Action for U.S. Appl. No. 16/555,817 (dated Aug. 7, 2020).

"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).

Commonly-Assigned, co-pending U.S. Appl. No. 16/945,794 for "Methods, Systems, and Computer Readable Media For Preferred Network Function (NF) Location Routing Using Service Communications Proxy (SCP)," (Unpublished, filed Jul. 31, 2020).

Notification of Transmittal of the International Search Report and the Written Opinion of the International Searching Authority, or the Declaration for International Application Serial No. PCT/US2020/035004 (dated Jul. 7, 2020).

"3rd Generation Partnership Project; Technical Specification Group Core Network and Terminals; 5G System; Network Function Repository Services; Stage 3 (Release 16)," 3GPP TS 29.510 V16.4.0, pp. 1-206 (Jul. 2020).

(56) References Cited

OTHER PUBLICATIONS

"3rd Generation Partnership Project; Technical Specification Group Core Network and Terminals; 5G System; Technical Realization of Service Based Architecture; Stage 3 (Release 16)," 3GPP TS 29.500 V16.4.0 pp. 1-79 (Jun. 2020).

"3rd Generation Partnership Project; Technical Specification Group Services and System Aspects; Procedures for the 5G System (5GS); Stage 2 (Release 16)," 3GPP TS 23.502 V16.4.0, pp. 1-582 (Mar. 2020).

"3rd Generation Partnership Project; Technical Specification Group Services and System Aspects; System architecture for the 5G System (5GS); Stage 2 (Release 16)," 3GPP TS 23.501 V16.4.0, pp. 1-430 (Mar. 2020).

Cheshire et al., "Apple's DNS Long-Lived Queries protocol," Network Working Group, Apple, Inc., pp. 1-26 (Aug. 22, 2019).

Li et al., "Mobile Edge Computing Platform Deployment in 4G LTE Networks: A Middlebox Approach," https://www.usenix.org/system/files/conference/hotedge18/hotedge18-papers-li.pdf, 6 pages (2018).

"3rd Generation Partnership Project; Technical Specification Group Core Network and Terminals; Domain Name System Procedures; Stage 3 (Release 13)," 3GPP TS 29.303 V13.4.0, pp. 1-69 (Jun. 2016).

Abley et al., "A Mechanism for Remote-Triggered DNS Cache Flushes (DNS FLUSH)," Network Working Group, Google, pp. 1-12 (Jun. 24, 2013).

"LTE and Beyond," https://ytd2525.wordpress.com/2013/03/06/lte-and-beyond/, 3 pages (2013).

Commonly-Assigned, co-pending U.S. Appl. No. 17/356,451 for "Methods, Systems, and Computer Readable Media for Resolution of Inter-Network Domain Names" (Unpublished, filed Jun. 23, 2021).

Notification of Transmittal of the International Search Report and the Written Opinion of the International Searching Authority, or the Declaration for U.S. Patent Application Serial No. PCT/US2021/020120 (dated Jun. 1, 2021).

Notification of Transmittal of the International Search Report and the Written Opinion of the International Searching Authority, or the Declaration for U.S. Patent Application Serial No. PCT/US2021/020122 (dated Jun. 1, 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

"3rd Generation Partnership Project; Technical Specification Group Core Network and Terminals; Numbering, addressing and identification; (Release 17)," 3GPP TS 23.003, V17.1.0, pp. 1-143 (Mar. 2021).

"3rd Generation Partnership Project; Technical Specification Group Core Network and Terminals; 5G System; Public Land Mobile Network (PLMN) Interconnection; Stage 3 (Release 17)," 3GPP TS 29.573, V17.0.0, pp. 1-100 (Mar. 2021).

Nokia et al., "Discussion paper on authorization for Model D Indirect communications", 3GPP TSG SA WG3; S3-194380 (Nov. 11, 2019).

Notice of Allowance and Fee(s) Due for U.S. Appl. No. 16/697,021 (dated Jun. 21, 2021).

Huawei, "eSBA: reselection of producer instance," 3GPP TSG-SA2 Meeting #132, pp. 1-2 (Apr. 12, 2019).

Docomo, "Update Solution 4 for implicit registration," SA WG2 Meeting #129, pp. 1-2 (Oct. 15-19, 2018).

Commonly-Assigned, co-pending U.S. Appl. No. 17/392,288 for "Methods, Systems, and Computer Readable Media for Optimized Routing of Service Based Interface (SBI) Request Messages to Remote Network Function (NF) Repository Functions Using Indirect Communications Via Service Communications Proxy (SCP)" (Unpublished, filed Aug. 3, 2021).

Notice of Allowance and Fee(s) Due for U.S. Appl. No. 16/730,799 (dated Jul. 30, 2021).

Notification of Transmittal of the International Search Report and the Written Opinion of the International Searching Authority, or the Declaration for International Application No. PCT/US2021/024000 (dated Jun. 24, 2021).

"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).

\* cited by examiner

US 11,271,846 B2

METHODS, SYSTEMS, AND COMPUTER READABLE MEDIA FOR LOCALITY-BASED SELECTION AND ROUTING OF TRAFFIC TO PRODUCER NETWORK FUNCTIONS (NFS)

PRIORITY CLAIM

This application claims the priority benefit of Indian Patent Application Number 201841039876, filed Oct. 22, 2018, the disclosure of which is incorporated herein by reference in its entirety.

TECHNICAL FIELD

The subject matter described herein relates to routing traffic to NFs. More particularly, the subject matter described herein relates to methods, systems, and computer readable media for locality-based selection and routing of traffic to producer NFs.

BACKGROUND

In the 5G network architecture specified by the Third Generation Partnership Project (3GPP), the network function (NF) repository function (NRF) is the network entity that maintains the NF profile of available NF instances and their supporting services. The NRF also allows other NF instances to subscribe to and be notified regarding the registration in the NRF of new NF instances of a given type. The NRF supports service discovery functions by receiving NF discovery requests and providing available information about NF functions. NF functions are the nodes in the 5G system architecture that provide services, in the case of producer NFs, and that consume services, in the case of consumer NFs. The same NF may be both a producer NF and a consumer NF if the NF both consumes and provides services.

FIG. 1 is a block diagram illustrating an exemplary 5G system network architecture. The architecture in FIG. 1 includes NRFs 100 located in the home public land mobile network (HPLMN) and visited public land mobile network (VPLMN). In FIG. 1, any of the nodes besides NRFs 100 can be either consumer NFs or producer NFs, depending on whether they are requesting or receiving services. In the illustrated example, the nodes include a policy control function (PCF) 102 that performs policy related operations in a network, a user data management (UDM) function 104 that manages user data, a charging function (CHF) 106 that performs charging operations, and an application function 108 that provides application services. The nodes illustrated in FIG. 1 further include a session management function (SMF) 110 that manages sessions between access and mobility management function (AMF) 112 and PCF 102. AMF 112 performs mobility management operations, similar to those performed by a mobility management entity (MME) in 4G networks. An authentication server function (AUSF) 114 performs authentication services for user equipment (UEs) seeking access to the network. A user data repository (UDR) stores configuration information regarding user devices. A location management function (LMF) 118 provides location related services for user devices. A gateway mobile location center (GMLC) 120 stores location information for UEs and responds to location queries. A network slice selection function (NSSF) 122 provides network slicing services for devices seeking to access specific network capabilities and characteristics associated with a network slice. A network exposure function (NEF) 124 provides application programming interfaces (APIs) for application functions seeking to obtain information about Internet of things (IoT) devices and other UEs attached to the network.

As stated above, producer NFs register with the NRF to indicate the type of services that producer NFs provide. Producer NFs can register capacity and priority information with the NRF. Consumer NFs can discover producers that have registered to provide a specific service and can use the capacity and priority information to select a producer NF. However, there is currently no 3gpp defined procedure for consumer NFs to select producer NFs based on a locality preference.

Accordingly, there exists a need for methods, systems, and computer readable media for locality-based selection and routing of traffic to producer NFs.

SUMMARY

A method for locality-based selection and routing of network traffic to producer network functions (NFs) includes registering, by producer NFs, locality information with a network function registration function (NRF). The method further includes configuring, for each of a plurality of consumer NFs, locality preference rules. The method further includes detecting, by one of the consumer NFs, a need for a service provided by a plurality of different producer NFs, at least some of which are located in data centers with different localities. The method further includes selecting, by or on behalf of the one consumer NF and using the locality information registered for the producer NFs and the locality preference rules, a producer NF for providing the service to the one consumer NF.

According to another aspect of the subject matter described herein, registering the locality information with the NRF includes registering unstructured locality attribute values with the NRF.

According to another aspect of the subject matter described herein, registering the locality information with the NRF includes registering structured locality attribute values with the NRF.

According to yet another aspect of the subject matter described herein, the structured locality attribute values each include a region identifier, an availability domain identifier, and a data center or zone identifier.

According to yet another aspect of the subject matter described herein, configuring the locality preference rules includes configuring mappings between locality attribute values and preference values.

According to yet another aspect of the subject matter described herein, the mappings are structured to favor producer NFs located in the same data centers, regions, or geo-locations as consumer NFs.

According to yet another aspect of the subject matter described herein, the mappings are structured to favor producer NFs in order of decreasing latency with respect to location of or communication with consumer NFs.

According to yet another aspect of the subject matter described herein, the one consumer NF performs the selecting of the producer NF.

According to yet another aspect of the subject matter described herein, a proxy separate from the one consumer NF performs the selecting of the producer NF.

According to yet another aspect of the subject matter described herein, the proxy comprises a service access point (SAP).

According to yet another aspect of the subject matter described herein, a system for locality-based selection and routing of network traffic to producer network functions (NFs) is disclosed. The system includes a network node. The network node includes at least one processor and a memory. The system further includes a plurality of locality preference rules stored in the memory. The system further includes a producer NF selection function for detecting a need for a service provided by a plurality of different producer NFs, at least some of which are located in data centers with different localities and selecting, by or on behalf of the one consumer NF and using the locality information registered for the producer NFs and the locality preference rules, a producer NF for providing the service to the one consumer NF.

According to yet another aspect of the subject matter described herein, the locality preference rules stored in the memory of the network node include mappings between locality attribute values and preference values.

According to yet another aspect of the subject matter described herein, the locality preference rules stored in the memory of the network node mappings between unstructured locality attribute values and preference values.

According to yet another aspect of the subject matter described herein, the locality preference rules stored in the memory of the network node include mappings between structured locality attribute values and preference values.

According to yet another aspect of the subject matter described herein, the mappings stored in the memory of the network node are structured to favor producer NFs located in the same data centers, regions, or geo-locations as consumer NFs.

According to yet another aspect of the subject matter described herein, the mappings stored in the memory of the network node are structured to favor producer NFs in order of decreasing latency with respect to communications with consumer NFs.

According to yet another aspect of the subject matter described herein, the network node comprises a consumer NF.

According to yet another aspect of the subject matter described herein, the network node comprises a proxy separate from the consumer NF that performs the selecting of the producer NF.

According to yet another aspect of the subject matter described herein, the proxy comprises a service access point (SAP).

According to yet another aspect of the subject matter described herein, a non-transitory computer readable medium having stored thereon executable instructions that when executed by a processor of a computer controls the computer to perform steps is provided. The steps include detecting a need for a service provided by a plurality of different producer NFs, at least some of which are located in data centers with different localities. The steps further include selecting, by or on behalf of the one consumer NF and using the locality information registered for the producer NFs and the locality preference rules, a producer NF for providing the service to the one consumer NF. The steps further include routing traffic to the producer NF selected to provide the service.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Current 5G specifications allow multiple producer NFs to register with the NRF for the same service. When registering with the NRF, producer NFs may publish various parameters to the NRF. Some of the parameters are:

List of services provided by the NF;
Priority;
Weight;
etc.

Using these parameters, a consumer NF, an NRF, or a service based architecture (SBA) NF proxy [or SCP in 3gpp release 16], referred to as a service access point (SAP), can select an NF to provide a particular service. Once an NF is registered with the NRF, other NFs can learn about the registered NF through the NNRF_NF discovery service. According to the NNRF_NF discovery service, a consumer NF sends a discovery request to the NRF. The NRF responds to the discovery request with one or more NF profiles specified by parameters in the discovery request message. Once the consumer NF receives the service profiles, the consumer NF can select a producer NF to provide a given service based on rules configured in the consumer NF.

Figure 2:
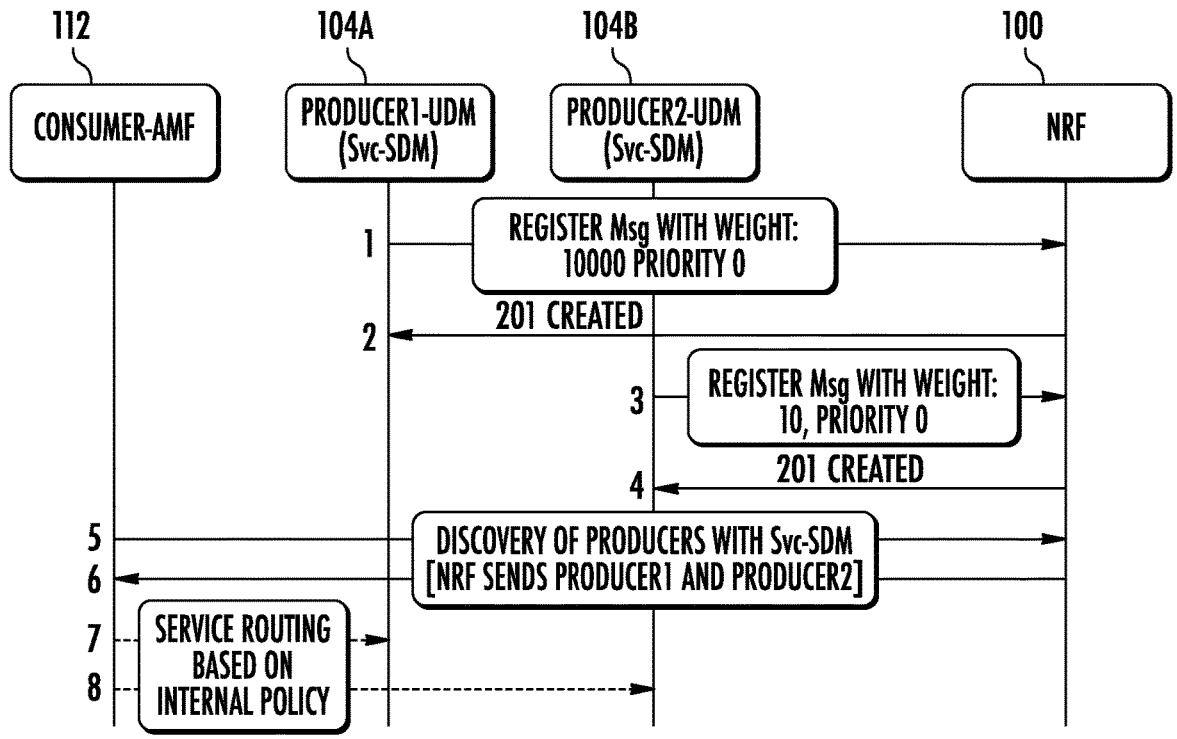
FIG. 2 is a message flow diagram illustrating 5G NF registration and service discovery.

FIG. 2 is a message flow diagram illustrating an exemplary message flow for 5G registration and discovery procedures. Referring to FIG. 2, in line 1 of the message flow diagram, a producer NF 104A, which in the illustrated example is a UDM, send a register message to NRF 100. The register message includes a weight of 10,000 and a priority of 0. Weight or capacity is an indication of the static capacity of the NF relative to other NFs of the same type. The priority parameter or attribute is an indication of priority of the NF relative to other NFs of the same type. A lower value of the priority attribute indicates a higher priority. The register message may also specify the type of service provided by producer NF 104A. NRF 100 stores the profile, the weight, and the priority for producer NF 104A.

In line 3 of the message flow diagram, a second producer NF 104B, which is also a UDM, sends a register message to an NRF 100. The register message includes a weight of 10 and a priority of 0. In line 4 of the message flow diagram, NRF 100 responds to the registration with a hypertext transfer protocol (HTTP) 201 created message, indicating that a profile for producer NF 104B has been successfully created.

In line 5 of the message flow diagram, consumer NF 112, which in the illustrated example is an AMF, sends a discovery request message to NRF 100. The discovery request message requests discovery of all producer NFs that provide subscriber data management (SDM) service. The UDM is an example of a producer NF that provides subscriber data management service. In line 6 of the message flow diagram, NRF 100 responds with a list of producer NFs, including producer NF 104A and NF 104B, that provide SDM service. In lines 7 and 8 of the message flow diagram, consumer NF 112 routes traffic to producer NFs 104A and/or 104B based on an internal routing policy, the message weight, and the message priority.

Figure 3:
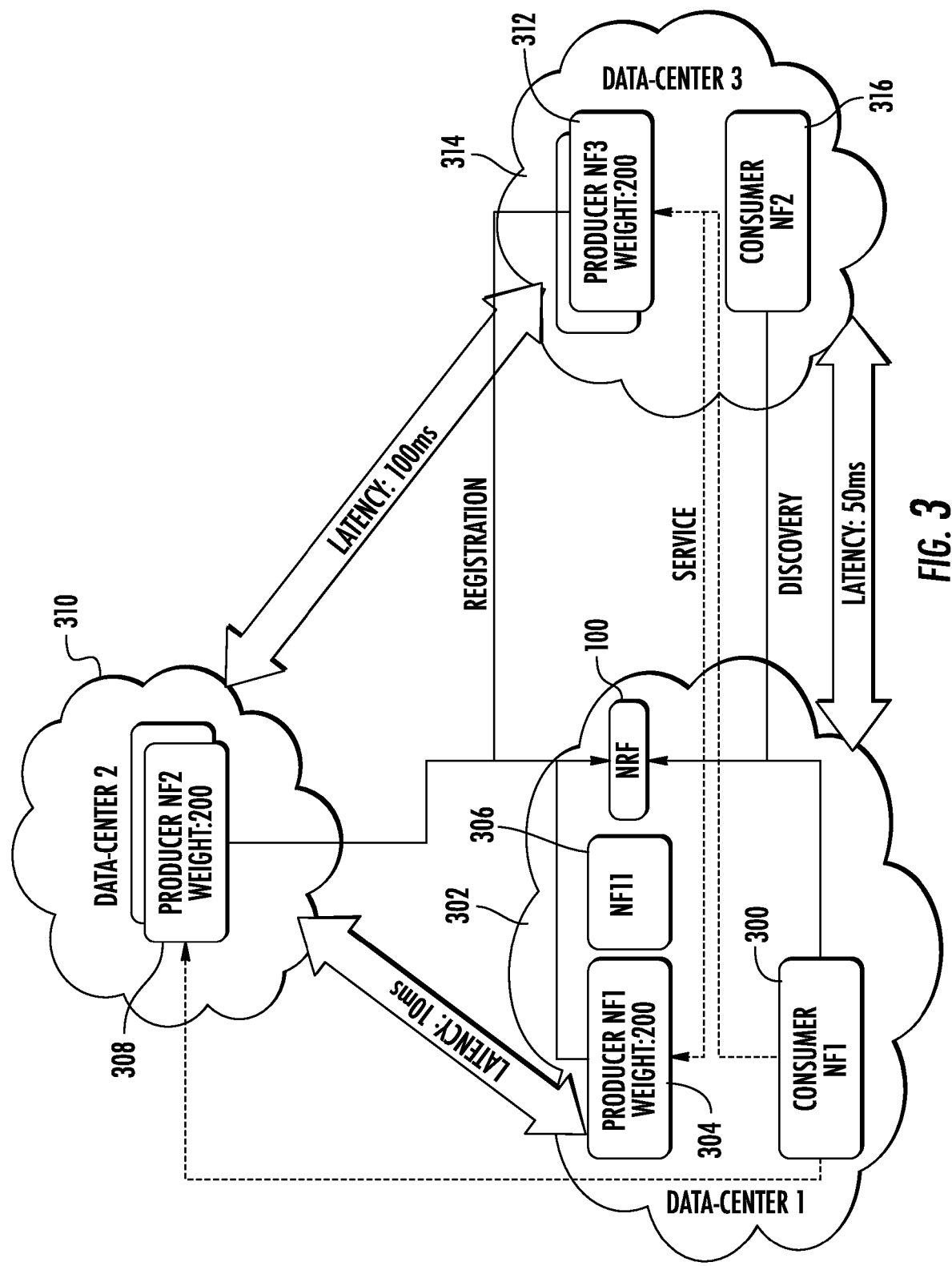
FIG. 3 is a network diagram illustrating producer and consumer NFs located in different data centers, regions or locations.

While using priorities and weight to select producer NFs is beneficial, such a solution fails to take into account the relative localities of producer and consumer NFs and can result in unnecessary latency in service transactions. FIG. 3 illustrates problems associated with suboptimal selection of producer NFs. In FIG. 3, a consumer NF 300 is located in a first data center 302. A producer NF 304 is co-located with consumer NF 300 in data center 302. A second producer NF 306 is also co-located with consumer NF 300 in data center 302.

Another producer NF 308 is located in a second data center 310 remote from data center 302. The latency between data centers 310 and 302 is 10 milliseconds. It is assumed that the latency within a data center is negligible or at least an order of magnitude less than the latency between data centers.

A third producer NF 312 is located in a third data center 314. Another consumer NF 316 is also located in data center 314. The latency between data center 302 and data center 314 is 50 milliseconds. The latency between data center 310 and data center 314 is 100 milliseconds.

In the registration phase, producer NFs 304, 306, 308, and 312 each register with NRF 100. The registration includes weight values and can also include priority values. However, the registration does not include locality information, which would indicate the data center in which each producer NF is located.

During the discovery phase, consumer NF 300 may query NRF 100 for producer NFs that provide a given service. NRF 100 may respond with the list of NFs and their relative weights or capacities. Because producer NFs 304, 306, 308, and 312 all have the same weights, consumer NF 300 may distribute traffic equally to producer NFs 304, 306, 308, and 312, without regard to the locality in which producer NFs 304, 306, 308, and 312 are located. Thus, even though producer NF 304 and producer NF 306 are co-located with consumer NF 300, consumer NF 300 may select remote producer NF 308 or remote producer NF 312 to provide the same service that could be provided by local producer NF 304 or 306. Such selection would be suboptimal in terms of latency.

In another example, consumer NF 300 may desire to select a producer NF located in a different data center. For example, when producer NFs 304 and 306 are down, consumer NF 300 may need to select one of producer NFs 308 and 312 to provide a given service. Because the latency between data centers 302 and 310 is less than the latency between data centers 302 and 314, it would be desirable for consumer NF 300 to select producer NF 308 located in data center 310. Similarly, when producer NF 312 is down, consumer NF 316 would desirably select producer NF 304, rather than producer NF 308, because of the increased latency between data centers 310 and 314 relative to the latency between data centers 302 and 314.

Figure 4:
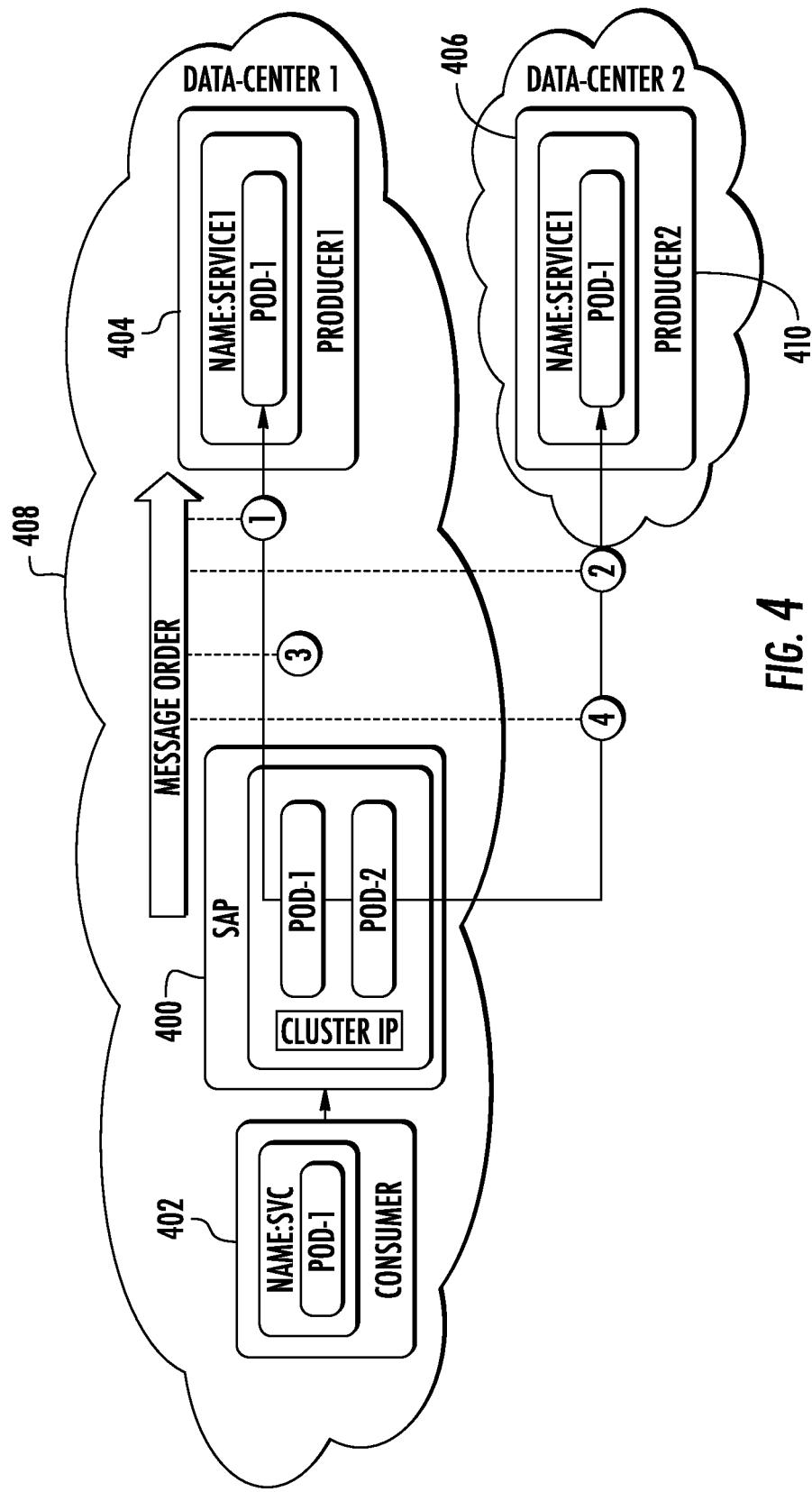
FIG. 4 is a network diagram illustrating load balancing of messages among producer NFs.

The problem of selecting the optimal network function for providing a given service extends to the improved service based architecture for 5G networks as well. 3GPP TR 23.742, 3rd Generation Partnership Project; Technical Specification Group Services and System Aspects; Study on Enhancements to the Service-Based Architecture (Release 16) (December 2018), the disclosure of which is incorporated herein by reference in its entirety, specifies improvements to the service-based architecture. Among these improvements are a common access point for forwarding and load balancing between consumer and producer NFs. According to section 6.2 of 3GPP TR 23.742, the node or access point that performs load balancing and messaging between service consumers and service producers is referred to as the service access point (SAP). FIG. 4 illustrates the improved 5G architecture. In FIG. 4, service access point (SAP) 400 routes messages between a consumer NF 402 and producer NFs 404 and 406. Consumer NF 402 is located in the same data center 408 as producer NF 404. Producer NF 406 is located in a different data center 410 from consumer NF 402.

In the illustrated example, consumer NF 402 sends messages requesting service to SAP 400. SAP 400 load balances the messages between producer NFs 404 and 406. The message order in FIG. 4 is messages 1 and 3 go to producer NF 404 while messages 2 and 4 go to producer NF 406. SAP 400 does not consider the locality of producer NFs 404 and 406 when making load balancing decisions. Accordingly, as with the architecture illustrated in FIG. 3, SAP 400 can route messages to producer NFs in a suboptimal manner with regard to latency and other factors associated with producer NFs being located in different data centers from the consumer NF.

To avoid the difficulties illustrated in FIGS. 3 and 4, the subject matter described herein includes the structure and use of a locality parameter to enable optimal NF selection. 3GPP TS 29.510, 3rd Generation Partnership Project; Technical Specification Group Core Network and Terminals; 5G System; Network Function Repository Services; Stage 3 (Release 15) (December 2018), the disclosure of which is incorporated herein by reference in its entirety, discloses a locality parameter that can be registered as part of an NF profile. For example, Table 6.1.6.2.2-1 specifies the following about the locality attribute:

TABLE 1

Structure of locality attribute defined in 3GPP TS 29.510

| Attribute Name | Data Type | P | Cardinality | Description |
|---|---|---|---|---|
| Locality | String | O | 0 . . . 1 | Operator defined information about location of the NF instances (e.g., geographic location, data center) (Note 3) |

In Table 1, the locality parameter or attribute is an attribute used to identify the locality or data center in which an NF resides. Note 3 following the table in TS 29.510 states as follows, "A requester NF may use this information to select a NF instance (e.g., a NF instance preferably located in the same data center)". The remaining fields in Table 1 specify the name of the Attribute, the data type, whether the parameter is optional or mandatory, and the cardinality.

According to one aspect of the subject matter described herein, producer NFs may register their localities with the NRF and each consumer NF may be configured with mappings between localities and preference values. Configuring each consumer NF with a mapping between localities and preference values may be suitable for small and medium scale deployments. In a second solution, producer NFs may use a structured locality field that specifies a hierarchical locality of each producer NF, and consumer NFs may use internal logic to parse the structured locality attribute to select appropriate producer NFs. The second solution may be suitable for all types of deployments, including large-scale deployments. In the third solution, the SAP may select producer NFs on behalf of consumer NFs using either the unstructured locality attribute values specified in the first solution or the structured locality attribute values specified in the second solution. Each of the solutions will now be described in more detail.

Figure 5:
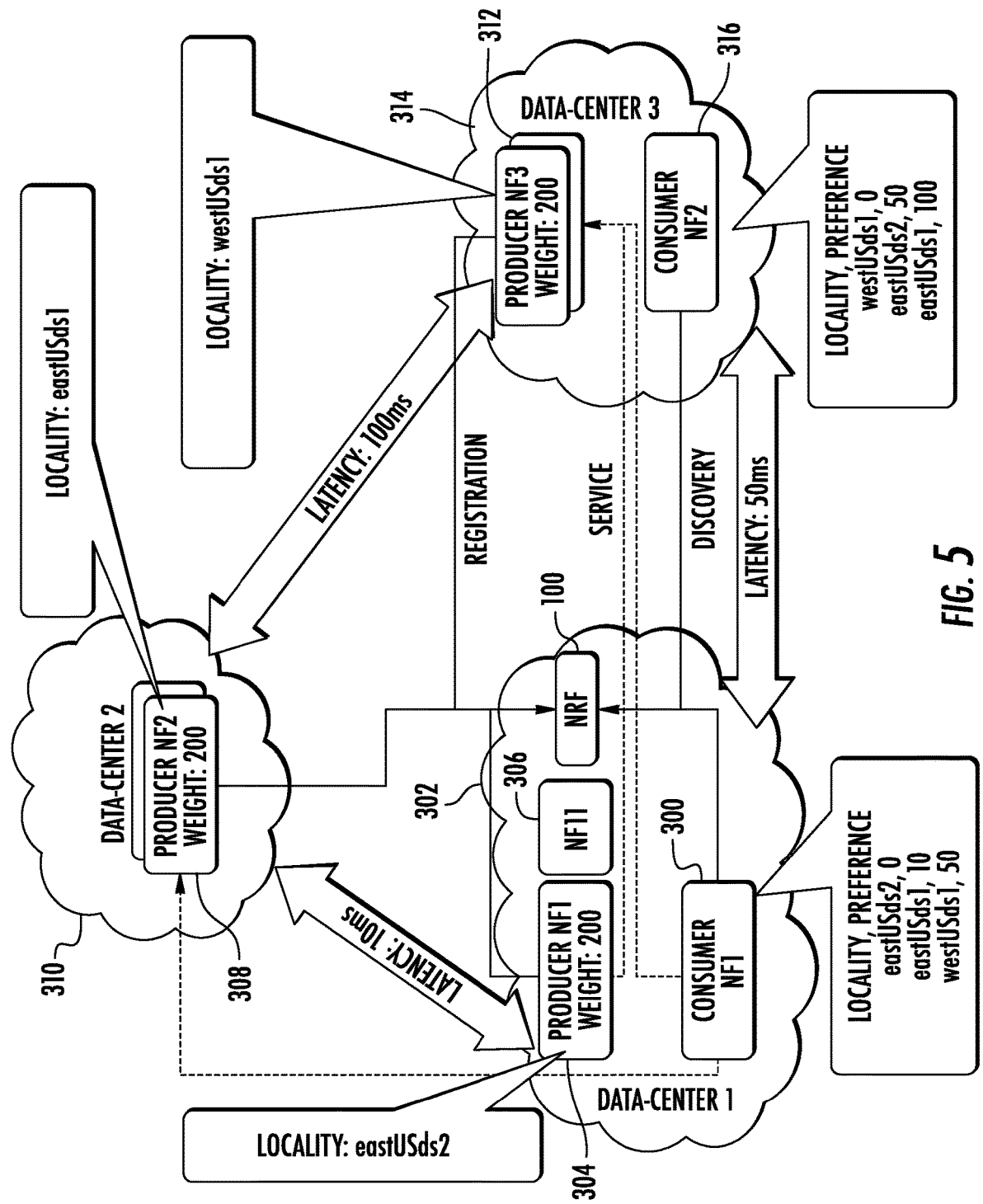
FIG. 5 is a network diagram illustrating the use of locality preference in selecting producer NFs to provide a given service.

As stated above, in the first solution, each consumer NF is configured with mappings between NF localities and preference values. FIG. 5 is a network diagram illustrating such an example. The elements in FIG. 5 are the same as those illustrated in FIG. 3. Accordingly, the same reference numbers are used to describe the elements in FIG. 5. However, rather than using weights and priorities alone to select producer NFs, consumer NFs are configured with mappings between producer localities and preference values, and the consumer NFs use the mappings to select producer NFs to provide a given service. In the illustrated example, the preference values are integers ranging from 0 to 100, with 0 indicating the most preferred preference values. The locality parameters are identifiers of data centers. For example, for data center 302, consumer NF 300 is configured with a preference of 0 for locality parameter eastUSds2, which corresponds to data center 302. Consumer NF 300 is configured with a preference value of 10 for locality attribute eastUSds1, which corresponds to data center 310. Consumer NF 300 is configured with a preference attribute value of 50 for locality attribute westUSds1, which corresponds to data center 314. Similarly, consumer NF 316 is configured with a preference attribute value of 0 for the locality attribute value westUSds1. Consumer NF 316 is configured with a preference attribute value of 50 for locality attribute value eastUSds2, which corresponds to data center 302. Consumer NF 316 is configured with a preference attribute value of 100 for data center locality attribute value eastUSds1, which corresponds to data center 310.

When producer NFs register with NRF 100, the producer NFs register their locality attribute values. In FIG. 5, producer NF 304 would register the locality attribute eastUSds2. Producer NF 312 would register the locality attribute value westUSds1. Producer NF 308 would register the locality attribute values eastUSds1. It should be noted that in FIG. 5, the locality attribute values are unstructured in that there is no defined structure across data centers for specifying locality attribute values. Thus, it is possible that different data centers could provision overlapping locality attribute values within NRF 100. In addition, because the locality attributes specify data center only, there is no ability to implement locality preferences among NFs within a data center.

When a consumer NF initiates the discovery process by sending a discovery request message to NRF 100, NRF 100 responds with a list of available producer NFs and their corresponding localities. Upon receiving the list, the consumer NF may sort the list of producer NFs based on producer locality and configured locality preference for the consumer NF. The list will thus represent producer NFs in preference order. If multiple producer NFs have the same locality or corresponding same preference attribute value, the consumer NF may use load balancing or other parameters, such as weight and/or priority, to select among producer NFs with the same preference value. Table 2 shown below illustrates an example master list of consumer NFs and corresponding producer NFs sorted according to preference.

TABLE 2

Sorted Producer NF List

| CONSUMER NF | PRODUCER NF | PREFERENCE |
|---|---|---|
| NF1 | NF1 | 0 |
| NF1 | NF2 | 10 |
| NF1 | NF3 | 50 |
| NF2 | NF3 | 0 |
| NF2 | NF1 | 50 |
| NF2 | NF2 | 100 |

In the example above in Table 2, consumer NF1 will first contact producer NF1. If producer NF1 is unavailable, consumer NF1 will try producer NF2. If producer NF2 is unavailable, consumer NF1 will try producer NF3. Similarly, consumer NF2 will first attempt to contact producer NF3. If producer NF3 is unavailable, consumer NF2 will next try to contact producer NF1. If producer NF1 is unavailable, consumer NF2 will contact producer NF2. Thus, the first solution provides NF configured mappings between producer NF locality attributes and preference value attributes. Such a solution is ideal for small-scale deployments. However, the solution does not provide guidelines for producer NFs to specify the locality attributes. Without such guidance, two producer NFs in different regions and data centers may mistakenly use the same locality value, which will cause the consumer NF to assume that the producer NFs belong to the same area or region. As a result, producer NFs can be mistakenly selected by the consumer NF for routing. Another problem associated with an open range of locality values is that different producer types in the same area, data center, or lab may use different locality values. This would result in configuration information on the NF or SAP that is difficult to maintain. To solve these problems, in the second solution described herein, a structured locality parameter that may be used. Using a structured locality parameter, the consumer NF or SAP can have limited configuration to address a greater range of producer NFs. In one example, the locality parameter can be structured using the following parameters:

Oracle cloud deployments: region, availability domain, zone

Non-Oracle cloud deployments: region, zone (data center)

Regions are completely independent of other regions and can be separated by vast distances—across countries or even continents. All the availability domains in a region are connected to each other by a low latency, high bandwidth network. A zone is a data center with a single Kubernetes cluster. A Kubernetes cluster is a processing cluster in a Kubernetes enabled cloud network. Producer NFs can obtain the locality information from an infrastructure variable, e.g., pods or through operator configuration. A pod is the smallest processing block in a Kubernetes cluster. Kubernetes is an open-source platform for deploying services in a cloud network.

Figure 6:
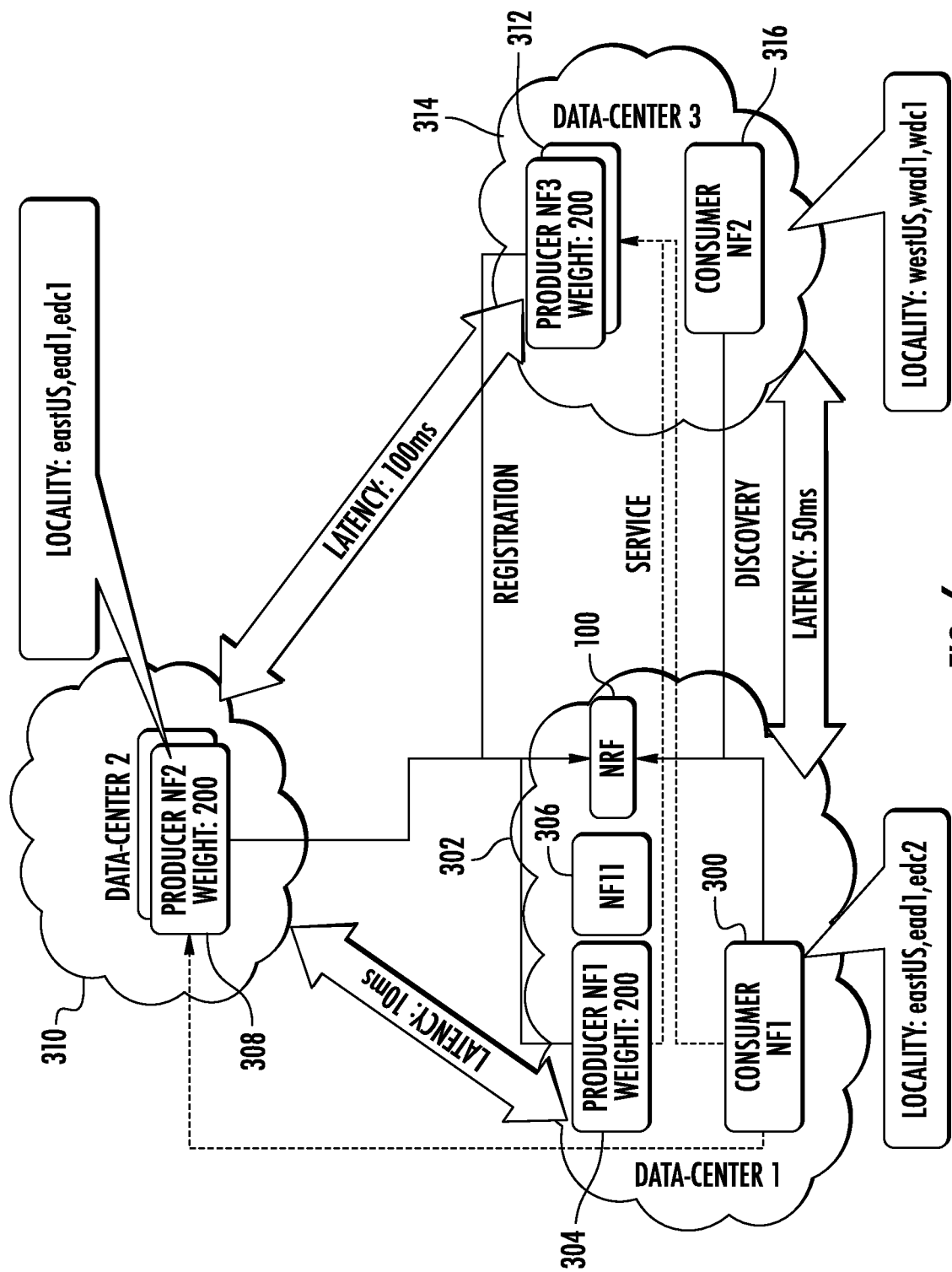
FIG. 6 is a network diagram illustrating hierarchical locality specifications and the use of the hierarchical locality specifications to select producer NFs to provide a given service.

FIG. 6 illustrates an example of producer NFs being configured with structured locality parameters and the use of the structure locality parameters for NF selection. In FIG. 6, data center 302 includes the structured locality parameter eastUS, ead1, edc2, which respectively specifies the region, availability domain, and zone of data center 302. Similarly, data center 314 is configured with the structured locality parameter westUS, wad1, wdc1. Data center 310 is configured with the structure locality parameter eastUS, ead1, edc1. Each consumer NF within data centers 302, 314, and 310 may be configured with preference attribute values that correspond to the structured locality attribute values. Table 3 shown below illustrates an example of preference rules that may be configured for consumer NFs in the locality eastUS, ead1, edc2.

TABLE 3

Preference Rules for Consumer NFs in eastUS, ead1, edc2

| REGION | AD | DATA CENTER | PREFERENCE |
|---|---|---|---|
| eastUS | ead1 | edc2 | 0 |
| eastUS | ead1 | edc1 | 10 |
| westUS | wad1 | wdc1 | 50 |

Figure 1:
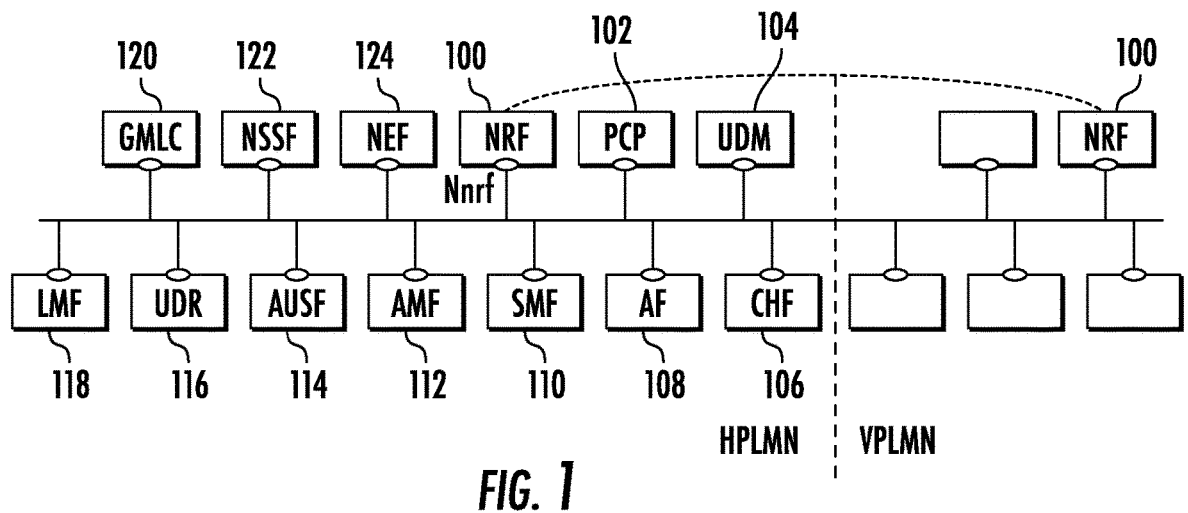
FIG. 1 is a network diagram illustrating an exemplary 5G network architecture.

In Table 3, the first row indicates that producer NFs with the region eastUS, the availability domain ead1, and the data center edc2, will be assigned a preference value of 0. The other data centers illustrated in FIG. 1 are assigned preference values of 10 and 50, respectively. Table 4 shown below illustrates an example of mappings between structured locality attribute values and preference attribute values for the data center eastUS, ead1, edc2, which corresponds to data center 310 Illustrated in FIG. 1.

TABLE 4

Preference Rules for Consumer NFs in eastUS, ead1, edc1

| REGION | AD | DATA CENTER | PREFERENCE |
|---|---|---|---|
| westUS | wad1 | wdc1 | 0 |
| eastUS | ead1 | edc2 | 10 |
| eastUS | ead1 | edc1 | 100 |

Table 4 includes mappings between structured data center locality attribute values and preference values. For example, producer NFs with the region westUS, availability domain wad1, data center wdc1 will be assigned a preference of 0. Preference values of 50 and 100 will respectively be assigned to producer NFs in the remaining data centers illustrated in FIG. 6.

As with the first solution, each consumer NF will register its locality attribute information within NRF 100. When a consumer NF sends a discovery request to NRF 100 for a particular service, NRF 100 will respond with the structured locality attribute values for each producer NF that provides the requested service. The consumer NFs will then sort the producer NFs that provide the requested service according to preference order based on the configured locality preference for each consumer NF. The consumer NF will then select the producer NF to provide the service in order according to the preference to structured locality attribute mapping.

Figure 7:
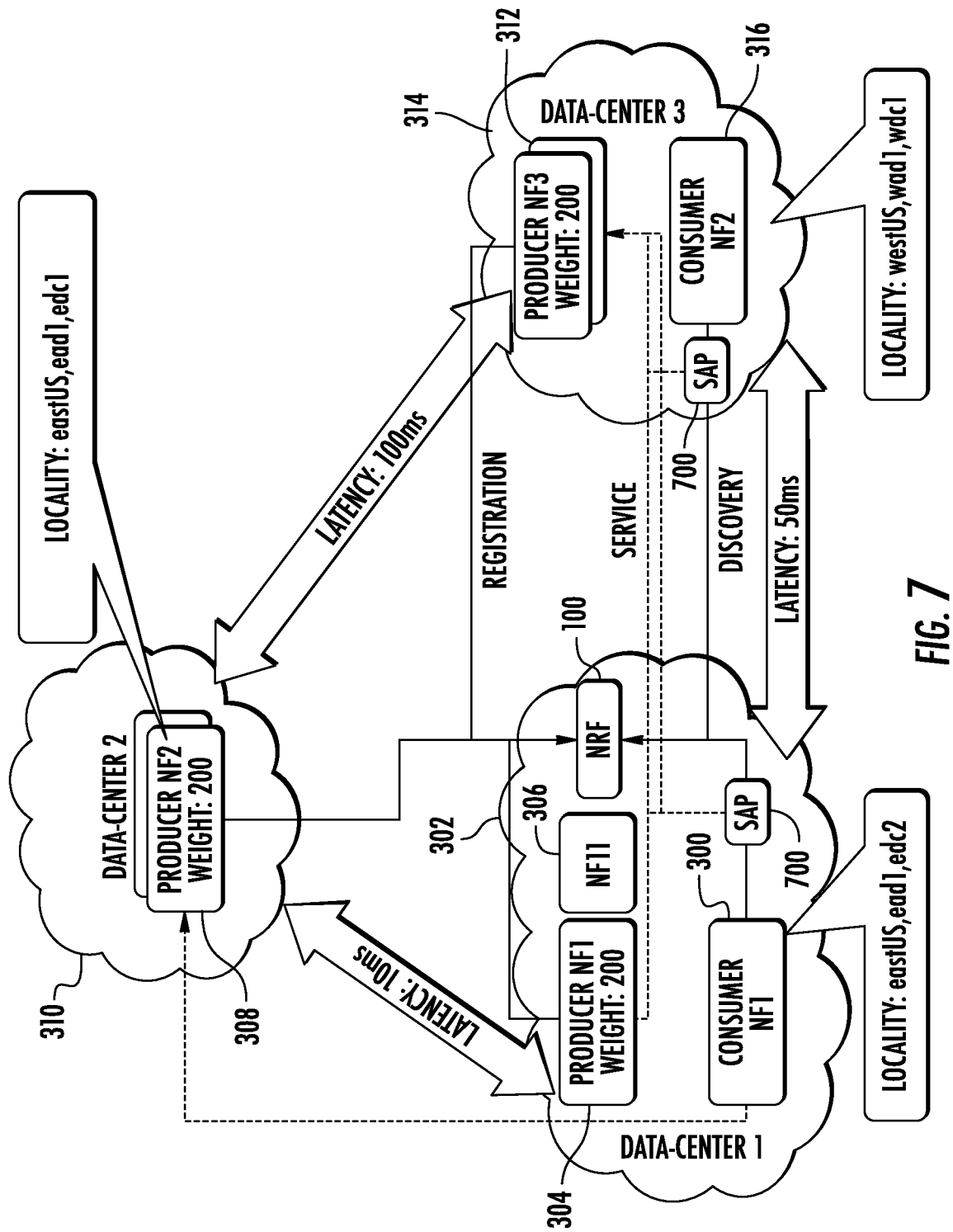
FIG. 7 is a network diagram illustrating the use of a service access point (SAP) to select producer NFs on behalf of consumer NFs.

In solutions 1 and 2, consumer NFs store locality preference mappings and implement the logic to select producer NFs. While such solutions are beneficial over non-locality based approaches, such solutions require consumer NFs to run additional logic to obtain the list of preferred producer NFs and select the best producer NFs. In solution 3, rather than having each consumer NF run this logic, the service access point or SAP may function as a proxy to select the producer NF for each consumer NF based on locality preference information configured with the proxy for each producer NF. FIG. 7 illustrates such a solution. In FIG. 7, data centers 302 and 314 are each configured with an SAP 700. SAP 700 in data center 302 may be configured with locality preferences for each consumer NF in data center 302. The locality preferences may be the structured locality preferences described above with respect to solution 2 or the unstructured locality preferences described above with respect to solution 1. Similarly, SAP 700 in data center 314 may be configured with the structured or unstructured locality preferences for data center 314. Each SAP 700 may contact NRF 100 to obtain locality information for registered producer NFs and their respective services. Upon NRF discovery, a consumer NF can select any producer NF that provides a requested service and send a message to SAP 700 for delivery. SAP 700 will use the configured preference information to select the producer NF to provide the given service. When the producer NF responds to the message, SAP 700 may add an HTTP "location" header to the response to the consumer NF so that the consumer NF will know about the serving producer NF. The HTTP information may be specified according to IETF RFC 7231, Hypertext Transfer Protocol (HTTP/1.1): Semantics and Content, June 2014, the disclosure of which incorporated herein by reference in its entirety. SAP 700 may also use other producer NF attributes, such as priority and weight, to load balance messages among producer NFs that have the same locality. An example of such load balancing is illustrated in FIG. 4.

Benefits of solution 3 include the offloading of processing from consumer NFs to find a producer NF. Using the structured locality solution in FIG. 2, deployments of consumer and producer NFs can be scaled from a single Kubernetes cluster to multi-cluster deployments along with geodiverse deployments across data centers and regions. Using the hierarchical lookup structure in solution 2 can help consumers NFs locate producer NFs more accurately without overlapping locality mappings.

Figure 8:
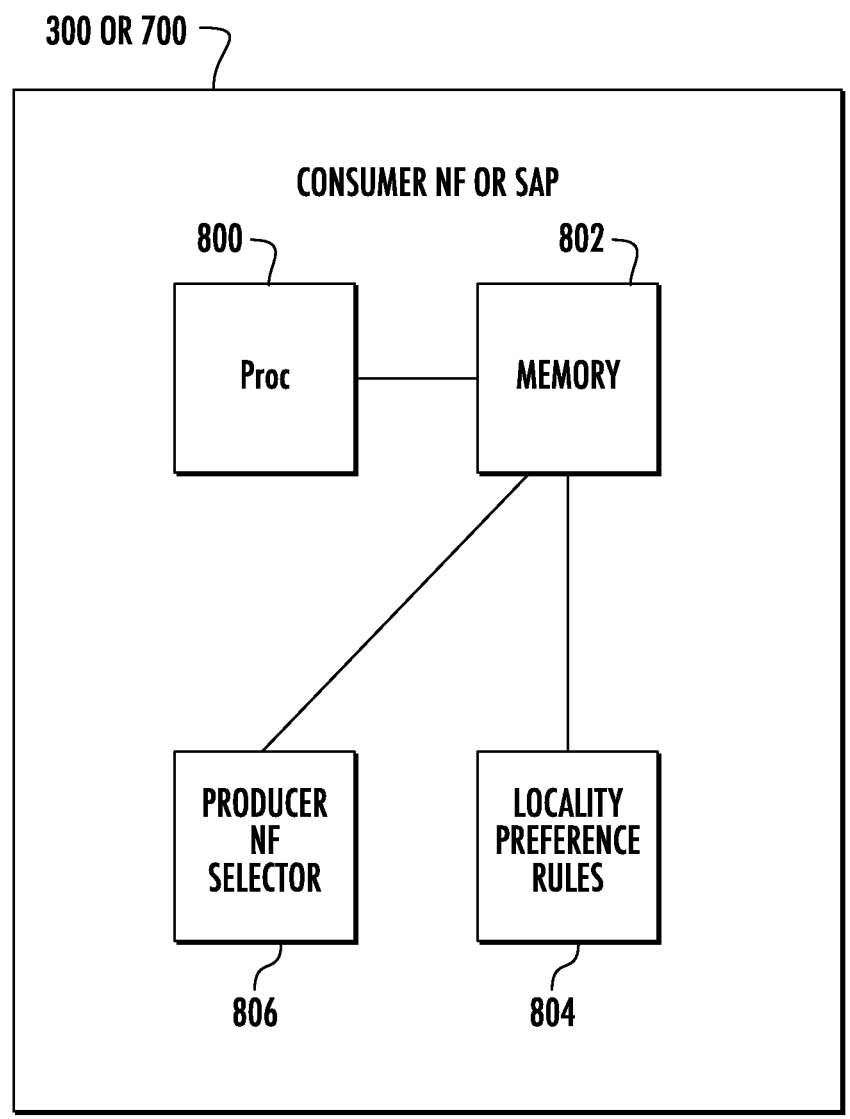
FIG. 8 is a block diagram illustrating an NF or SAP that uses locality preference information to select a producer NF to provide a given service.

FIG. 8 is a block diagram of a consumer NF or SAP configured to provide the producer NF selection functionality using locality preference mappings described herein. Referring to FIG. 8, a consumer NF or SAP 300 or 700 may include at least one processor 800 and a memory 802. Consumer NF or SAP 300 or 700 may be configured with locality preference mappings 804 of the unstructured or structured type described above. A producer NF selector 806 my implement the logic described herein for producer NF selection using locality preference mappings.

Figure 9:
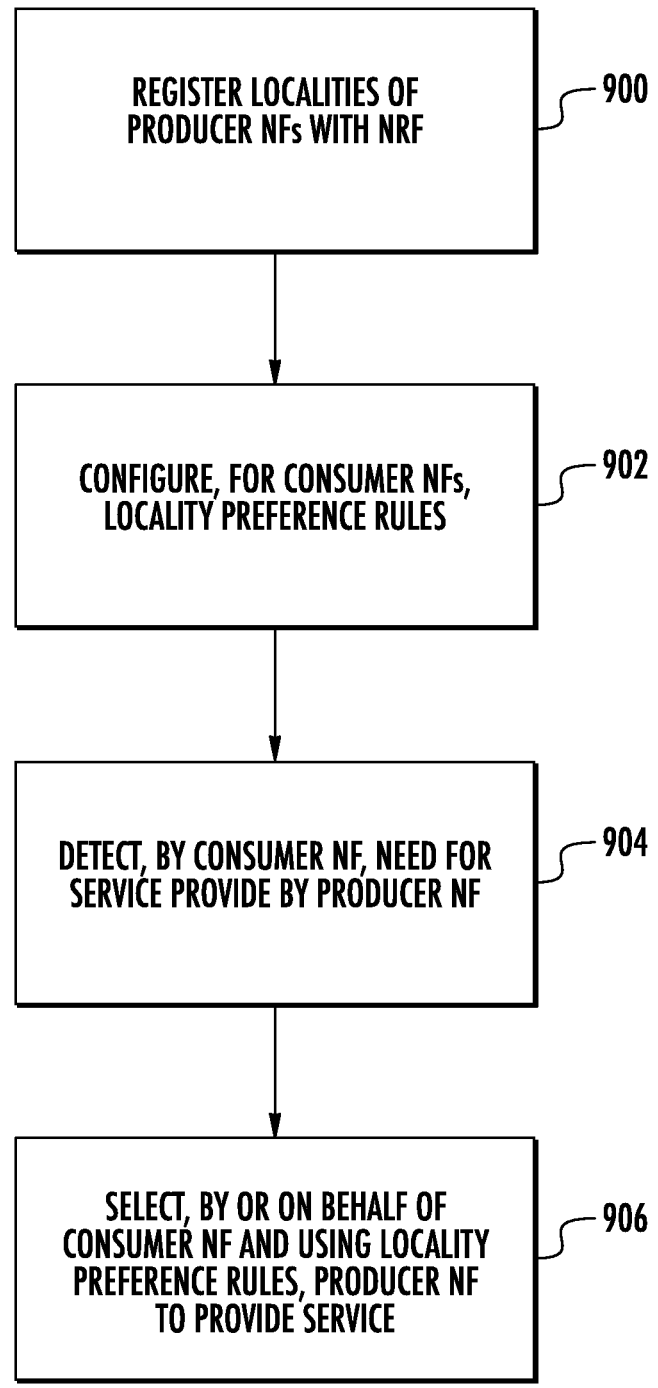
FIG. 9 is a flow chart illustrating an exemplary process for locality-based selection and routing of network traffic to producer NFs.

FIG. 9 is a flow chart of an exemplary process for locality-based selection of producer NFs. Referring to FIG. 9, in step 900, localities of producer NFs are registered with the NRF. For example, each producer NF in each data center may register its locality with an NRF. The locality may be specified using the structured or unstructured locality attributes described above.

In step 902, locality preference rules are configured for each consumer NF. The locality preference rules may be configured with each consumer NF or with a proxy or SAP that selects producer NFs on behalf of consumer NFs. The locality preference rules may include mappings between locality attribute values and preference values. The locality attribute values may be structured or unstructured. Unstructured locality attribute values allow producer NFs to select their own attribute values without regard to selection of locality attribute values by other producer NFs, which may lead to overlapping locality attribute values. Structured locality attribute values may include a hierarchy of locality attribute values, such as region, availability domain, and zone or data center. Each set of locality attribute values identifying a producer NF is globally unique. The mappings between the locality attribute values and the preference values may be stored at each of the individual NFs or at a proxy that performs producer NF selection on behalf of consumer NFs. The mappings may be structured to favor producer NFs located in the same data center as a consumer NF and to favor producer NFs in different data centers from the consumer NFs in order of decreasing latency.

In step 904, a consumer NF detects a need for service provided by a producer NF. For example, any of the NFs illustrated in FIG. 1 may detect need for service. If a UE contacts an AMF to request establishment of a data session, the AMF may contact a producer NF that provides policy services to determine the policies to be applied to the data session. An AMF that determines that a policy NF is needed to identify policies to apply for a service is just one example of the consumer NF detecting the need for a service provided by a producer NF. In another example, the AMF may need to determine the location of an AMF or other node where a UE is currently registered. To obtain such information, the AMF may need to contact a producer NF that provides subscriber location information. Such information may be stored in a UDR, a gateway mobile location center, or other node that stores current subscriber location information. Thus, an AMF determining that location related services are needed is another example of detecting a need for a service provided by a producer NF. A proxy or SAP that performs producer NF selection on behalf of a consumer NF may detect the need for a service in response to receiving a message from a consumer NF requesting a network service, such as location or policy service.

In step 906, the process includes selecting, by or on behalf of a consumer NF and using the locality preference rules, a producer NF to provide the service. For example, an NF or an SAP may use the stored locality preference rules to select a producer NF to provide a given service. As stated above, the stored preference rules may be structured to preferentially select producer NFs that are located in the same data center as the consumer NF. If all producer NFs located in the same data center as the consumer NF are unavailable, the stored locality preference rules may prefer producer NFs in other data centers in order of increasing latency (lowest latency is most preferred) with respect to the data center of the consumer NF.

Once the producer NF is selected, the consumer NF may route traffic for the requested service to the producer NF selected to provide the service. As stated above, the locality preferences may be used in combination with priorities and capacity weights to preferentially route traffic to producer NFs. The operator may configure consumer NFs to create list of producer NF based on priority and/or weight first and then select a producer NF based on locality preference (as discussed above). Otherwise, consumer NF can create list of producer NFs based on locality preference first and then select producer NF based on priority and/or weight.

Accordingly, the subject matter described herein improves the performance of computer networks by using locality preference information to reduce latency in traffic between consumer NFs and producer NFs. Using the structured locality parameter values described above with respect to FIG. 6, the performance of computer networks and databases is improved by allowing hierarchies of NFs to be defined and reducing the likelihood of overlapping locality information among different data centers. Using the NF selection proxy illustrated in FIG. 7, computer network technology is further improved by reducing the amount of configuration required over a solution where every consumer network function is required to be configured with locality preference information.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for locality-based selection and routing of network traffic to producer network functions (NFs), the method comprising:

registering, by producer NFs, locality attribute values with an NF repository function (NRF), the locality attribute values comprising operator-defined information about the locations of producer NF instances, including information identifying a geographic location or data center of each producer NF instance;

configuring, for each of a plurality of consumer NFs, locality preference rules;

detecting, by one of the consumer NFs, a need for a service provided by a plurality of different producer NFs, at least some of which are located in data centers with different localities, wherein the consumer NFs and the producer NFs each comprise 5G NFs and wherein the locality preference rules map, for each of the consumer NFs and based on localities of the consumer NFs and the producer NFs, different ones of the locality attribute values registered by the producer NFs with the NRF to different locality preference values, the locality preference values comprising numeric values ranging from a first number to a second number, the first number being a most preferred locality preference value, the second number being a least preferred locality preference value, and locality preference values between the first and second numbers that are closer to the first number being more preferred than locality preference values between the first and second numbers that are closer to the second number; and selecting, by or on behalf of the one consumer NF and using the locality attribute values registered by the producer NFs and the locality preference rules configured for the one consumer NF, including the locality preference values, a 5G producer NF for providing the service to the one consumer NF, wherein selecting the 5G producer NF comprises:

sending an NF discovery message to the NRF;

receiving, from the NRF, a list of available producer NFs and their corresponding locality attribute values; and selecting the 5G producer NF from the list having a locality attribute value corresponding to a most preferred locality preference value in the locality preference rules configured for the one consumer NF.

2. The method of claim 1 wherein registering the locality attribute values with the NRF includes registering unstructured locality attribute values with the NRF.

3. The method of claim 1 wherein registering the locality attribute values with the NRF includes registering structured locality attribute values with the NRF.

4. The method of claim 3 wherein the structured locality attribute values each include a region identifier, an availability domain identifier, and a data center or zone identifier.

5. The method of claim 1 wherein configuring the locality preference rules includes configuring the mappings between the locality attribute values and the locality preference values.

6. The method of claim 5 wherein the mappings are structured to favor producer NFs located in the same data centers, regions, or geo-locations as consumer NFs.

7. The method of claim 5 wherein the mappings are structured to favor producer NFs in order of decreasing latency with respect to communication with consumer NFs.

8. The method of claim 1 wherein the one consumer NF performs the selecting of the producer NF.

9. The method of claim 1 wherein a proxy separate from the one consumer NF performs the selecting of the producer NF.

10. The method of claim 9 wherein the proxy comprises a service access point (SAP).

11. A system for locality-based selection and routing of network traffic to producer network functions (NFs), the system comprising:

a network node including:
at least one processor;
a memory;
a plurality of locality preference rules stored in the memory, wherein the locality preference rules map a plurality of different locality attribute values registered by producer NFs with an NF repository function, the locality attribute values comprising operator-defined information about the locations of producer NF instances, including information identifying a geographic location or data center of each producer NF instance, to different locality preference values, the locality preference values comprising numeric values ranging from a first number to a second number, the first number being a most preferred locality preference value, the second number being a least preferred locality preference value, and locality preference values between the first and second numbers that are closer to the first number being more preferred than locality preference values between the first and second numbers that are closer to the second number; and a producer NF selection function for detecting a need for a service provided by more than one of the different producer NFs, at least some of which are located in data centers with different localities and selecting, using the locality attribute values registered by the producer NFs and the locality preference rules, including the locality preferences values, a producer NF for providing the service, wherein the producer NFs comprise 5G NFs and wherein selecting the producer NF comprises:

sending an NF discovery message to the NRF;

receiving, from the NRF, a list of available producer NFs and their corresponding locality attribute values; and selecting the producer NF from the list having a locality attribute value corresponding to a most preferred locality preference value in the locality preference rules stored in the memory of the network node.

12. The system of claim 11 wherein the locality attribute values comprise unstructured locality attribute values and the locality preference rules include mappings between the unstructured locality attribute values and the locality preference values.

13. The system of claim 11 wherein the locality attribute values comprise structured locality attribute values and the locality preference rules include mappings between the structured locality attribute values and the locality preference values, wherein the structured locality attribute values include a region identifier, an availability domain identifier, and a data center or zone identifier.

14. The system of claim 13 wherein the mappings are structured to favor producer NFs located in the same data centers, regions, or geo-locations as consumer NFs.

15. The system of claim 13 wherein the mappings are structured to favor producer NFs in order of decreasing latency with respect to communication with consumer NFs.

16. The system of claim 11 wherein the network node comprises a consumer NF.

17. The system of claim 11 the network node comprises a proxy separate from a consumer NF that performs the selecting of the producer NF on behalf of the consumer NF.

18. The system of claim 17 wherein the proxy comprises a service access point (SAP).

19. A non-transitory computer readable medium having stored thereon executable instructions that when executed by a processor of a computer controls the computer to perform steps comprising:

configuring locality preference rules for a consumer NF;

detecting a need for a service provided by a plurality of different producer NFs, at least some of which are located in data centers with different localities, wherein the consumer NF and the producer NFs each comprise 5G NFs and wherein the locality preference rules map locality attribute values registered by the producer NFs with an NF repository function, the locality attribute values comprising operator-defined information about the locations of producer NF instances, including information identifying a geographic location or data center of each producer NF instance, to different locality preference values of the 5G consumer NF for producer NF localities represented by the locality attribute values, the locality preference values comprising numeric values ranging from a first number to a second number, the first number being a most preferred locality preference value, the second number being a least preferred locality preference value, and locality preference values between the first and second numbers that are closer to the first number being more preferred than locality preference values between the first and second numbers that are closer to the second number;

selecting, by or on behalf of the 5G consumer NF and using the locality attribute values registered by the producer NFs and the locality preference rules configured for the 5G consumer NF, including the locality preference values, a 5G producer NF for providing the service to the 5G consumer NF, wherein selecting the 5G producer NF comprises:

sending an NF discovery message to the NRF;

receiving, from the NRF, a list of available producer NFs and their corresponding locality attribute values; and selecting the 5G producer NF from the list having a locality attribute value corresponding to a most preferred locality preference value in the locality preference rules configured for the 5G consumer NF; and routing traffic to the 5G producer NF selected to provide the service.

20. The method of claim 1 wherein the one consumer NF comprises a 5G access and mobility management function (AMF) and the 5G producer NF comprises a user data management (UDM) function.

* * * * *

UNITED STATES PATENT AND TRADEMARK OFFICE
CERTIFICATE OF CORRECTION

PATENT NO. : 11,271,846 B2
APPLICATION NO. : 16/356446
DATED : March 8, 2022
INVENTOR(S) : Rajiv Krishan Page 1 of 1

It is certified that error appears in the above-identified patent and that said Letters Patent is hereby corrected as shown below:

On the Title Page

Under Item (56) "Other Publications" on page 3, Column 1 at Line 14:
Delete ".eom" and insert -- .com --

Under Item (56) "Other Publications" on page 3, Column 2 at Line 10:
Delete "123502" and insert -- 123 502 --

Under Item (56) "Other Publications" on page 4, Column 1 at Line 11:
Delete "Netwok" and insert -- Network --

Signed and Sealed this
Twentieth Day of June, 2023

Katherine Kelly Vidal
*Director of the United States Patent and Trademark Office*